United States Patent
Tolani et al.

(10) Patent No.: US 10,795,901 B2
(45) Date of Patent: Oct. 6, 2020

(54) GENERIC ENTRY AND EXIT NETWORK INTERFACE SYSTEM AND METHOD

(71) Applicant: JPMORGAN CHASE BANK, N.A., New York, NY (US)

(72) Inventors: Rajesh Tolani, Upper Saddle River, NJ (US); Robert Mooney, Kildare (IE); Fred Short, Rye Brook, NY (US); Matthew Yazdi, Scarsdale, NY (US); Rafal Sitkowski, Old Bridge, NJ (US); Michael Coleman, Stamford, CT (US); Dan Collins, Muttontown, NY (US); Michael H. Robertson, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 235 days.

(21) Appl. No.: 15/974,201

(22) Filed: May 8, 2018

(65) Prior Publication Data
US 2018/0329964 A1 Nov. 15, 2018

Related U.S. Application Data

(60) Provisional application No. 62/503,558, filed on May 9, 2017.

(51) Int. Cl.
G06F 16/248 (2019.01)
G06F 9/54 (2006.01)
(Continued)

(52) U.S. Cl.
CPC .............. *G06F 16/248* (2019.01); *G06F 9/54* (2013.01); *G06F 16/215* (2019.01);
(Continued)

(58) Field of Classification Search
CPC .. G06F 16/248; G06F 16/215; G06F 16/2455; G06F 16/2365; G06F 16/24578; G06F 16/2457; G06F 9/54
See application file for complete search history.

(56) References Cited

U.S. PATENT DOCUMENTS

2003/0120593 A1* 6/2003 Bansal ................... G06Q 20/10
705/39
2013/0312015 A1* 11/2013 Coker ..................... G06F 9/547
719/330

(Continued)

*Primary Examiner* — Jay A Morrison
*Assistant Examiner* — Antonio J Caiado
(74) *Attorney, Agent, or Firm* — Hunton Andrews Kurth LLP

(57) ABSTRACT

The invention relates to a computer-implemented system and method for providing data services to a user via a best fit data matching application programming interface (API). The method may comprise exposing to the user, via the API, data services that are available electronically to the user. The data services are invoked with a query comprising a set of parameters. An automated query processing service is used to automatically analyze the parameters and match the parameters to a best electronic data source among a plurality of electronic data sources using a metadata store. The step of matching the parameters to the best electronic data source is based on a data quality metric, a date range and user permissions. The retrieved dataset, which is automatically presented to the user electronically via the API, can also be customized to include client-specific data elements.

20 Claims, 5 Drawing Sheets

| Capability | Basic (102) | Intermediate (104) | Advanced (106) |
|---|---|---|---|
| Data Discovery (112) | Basic Query<br>Retrieve the data-sets that a login user or production ID has access to. For a specific data-set return the list of data attributes. | | Advanced Query<br>Ability to retrieve the data-sets and related data-attributes specific to the user's login based on entitlements i.e. fine grained entitlement and row/column based access control. |
| Enterprise Search (114) | Basic Search<br>Retrieve data based on language based search. This approach includes using string decomposition, enrichment and substitution to search underlying data stores in parallel and return a ranked result set. | Assisted Search<br>Interact with an automated service agent that is able to access and use previous search characteristics to suggest search results or areas of direct and indirect interest. | Assisted Visualization<br>Interaction with an automated self-service agent as per "Assisted Search" whereby graphical search results sets are returned and can be saved or scheduled for routine delivery. Extensible to "Hey Google" type experience. |
| Multisource Query (116) | Basic Query<br>Retrieve data from API published services in a specific format from underlying data stores e.g. xml. This use case is suitable for data interaction that can tolerate some latency. It can support batch and/or scheduled daily reporting needs and query of historic data. | Direct Query<br>Retrieve data directly from a source from a data source. This use cases provides support for lifecycle events and exception management or notification use cases. | Combined Query<br>User can execute and customize queries that combine data from multiple sources, each with a different data update frequency. This can be used to create record sets which streams/real-time updates with batch/daily data. |
| Execute / Calculate (118) | Direct Query<br>As per "Direct Query". | Direct Execute<br>Execute a system procedure or user defined function in an underlying system (non IDL) which changes data state. | Direct Calculate<br>Create a calculation for direct execution i.e. where the data presented is not known before presentation time e.g. what if scenario based on user level selections and user specific weights. |
| Data Management & Storage (120) | Template Based Storage<br>Push/post data to a template that can be subsequently used as a source for client managed data e.g. account groups. | Per-Account/Profile Customizations<br>Users self-manage the scope of preferences in conjunction with account groups or entitlement. Preferences can be applied on a per channel basis. | External data integration<br>Users load reference information from third/external under entitlement to client data store. This supports multi-party views during data visualization. |
| Events & Notifications (122) | Scheduled Data Extract Delivery<br>API is used to deliver data to a designated location e.g. share folder over secure transfer. | Scheduled Multi-part Delivery<br>API is used to deliver packs multi-part data sets over secure channel to a client designated share location. Multi-part data sets are sent as single consistent file set. | Topics - Event Based Pipeline Push Event<br>Data can be delivered to a client based on the client subscription to a topic of interest e.g. Key operational events, operational exceptions, new data notifications. Data is stored in a queue and delivered to multiple channels (e.g. chat rooms, bots, signals, topics) |

(51) Int. Cl.
  *G06F 16/2455* (2019.01)
  *G06F 16/2457* (2019.01)
  *G06F 16/215* (2019.01)
  *G06F 16/23* (2019.01)

(52) U.S. Cl.
  CPC ...... *G06F 16/2365* (2019.01); *G06F 16/2455* (2019.01); *G06F 16/2457* (2019.01); *G06F 16/24578* (2019.01)

(56) References Cited

U.S. PATENT DOCUMENTS

| | | | |
|---|---|---|---|
| 2014/0278754 A1* | 9/2014 | Cronin | G06F 16/20 705/7.29 |
| 2017/0201850 A1* | 7/2017 | Raleigh | H04W 4/50 |
| 2017/0206278 A1* | 7/2017 | Silva | G06F 16/9535 |
| 2017/0277872 A1* | 9/2017 | Mercury | H04L 63/0823 |
| 2018/0097905 A1* | 4/2018 | Todasco | H04L 67/2847 |
| 2018/0173733 A1* | 6/2018 | Nath | G06N 20/00 |

* cited by examiner

| Capability | Basic (102) | Intermediate (104) | Advanced (106) |
|---|---|---|---|
| Data Discovery (112) | Basic Query<br>Retrieve the data-sets that a login user or production ID has access to. For a specific data-set return the list of data attributes. | | Advanced Query<br>Ability to retrieve the data-sets and related data-attributes specific to the user's login based on entitlements i.e. fine grained entitlement and row/column based access control. |
| Enterprise Search (114) | Basic Search<br>Retrieve data based on language based search. This approach includes using string decomposition, enrichment and substitution to search underlying data stores in parallel and return a ranked result set. | Assisted Search<br>Interact with an automated service agent that is able to access and use previous search characteristics to suggest search results or areas of direct and indirect interest. | Assisted Visualization<br>Interaction with an automated self-service agent as per "Assisted Search" whereby graphical search results sets are returned and can be saved or scheduled for routine delivery. Extensible to "Hey Google" type experience. |
| Multisource Query (116) | Basic Query<br>Retrieve data from API published services in a specific format from underlying data stores e.g. xml. This use case is suitable for data interaction that can tolerate some latency. It can support batch and/or scheduled daily reporting needs and query of historic data. | Direct Query<br>Retrieve data directly from a source from a data source. This use cases provides support for lifecycle events and exception management or notification use cases. | Combined Query<br>User can execute and customize queries that combine data from multiple sources, each with a different data update frequency. This can be used to create record sets which streams/real-time updates with batch/daily data. |
| Execute / Calculate (118) | Direct Query<br>As per "Direct Query". | Direct Execute<br>Execute a system procedure or user defined function in an underlying system (non IDL) which changes data state. | Direct Calculate<br>Create a calculation for direct execution i.e. where the data presented is not known before presentation time e.g. what if scenario based on user level selections and user specific weights. |
| Data Management & Storage (120) | Template Based Storage<br>Push/post data to a template that can be subsequently used as a source for client managed data e.g. account groups. | Per-Account/Profile Customizations<br>Users self-manage the scope of preferences in conjunction with account groups or entitlement. Preferences can be applied on a per channel basis. | External data integration<br>Users load reference information from third/external under entitlement to client data store. This supports multi-party views during data visualization. |
| Events & Notifications (122) | Scheduled Data Extract Delivery<br>API is used to deliver data to a designated location e.g. share folder over secure transfer. | Scheduled Multi-part Delivery<br>API is used to deliver packs multi-part data sets over secure channel to a client designated share location. Multi-part data sets are sent as single consistent file set. | Topics - Event Based Pipeline Push Event<br>Data can be delivered to a client based on the client subscription to a topic of interest e.g. Key operational events, operational exceptions, new data notifications. Data is stored in a queue and delivered to multiple channels (e.g. chat rooms, bots, signals, topics) |

FIG. 1

GENERIC ENTRY AND EXIT NETWORK INTERFACE SYSTEM AND METHOD

RELATED APPLICATIONS

This application claims priority from U.S. Application No. 62/503,558, entitled "Generic Entry and Exit Network Interface System and Method," filed May 9, 2017, which is incorporated herein by reference.

FIELD OF THE INVENTION

The present invention relates generally to a bidirectional interface system, and more particularly to a system and method for providing data to a user based on explicit or implicit data quality or visualization preferences.

BACKGROUND

Financial institutions and other businesses may provide a range of services such as account management, investment services, cash and trade processing and analytics to their clients. Due to the breadth of services and underlying data, it is generally necessary for such businesses to also provide support staff to assist the clients in taking full advantage of the large number of available systems, services and data. For example, the client may need assistance with understanding the full set of services and data that are available, the most appropriate data source for a particular inquiry, how to access the services and data, and the output format for the data. Known systems use multiple delivery methods and formats for data exchange between the business and its clients. In addition, such known systems are generally inflexible and inconsistently documented, which leads to manual processes at the offering business and by the clients. Consequently there is an inability of the business systems to integrate seamlessly with the clients' platforms and workflows. These and other drawbacks exist in known interface systems.

SUMMARY

The invention relates to a computer-implemented system and method for providing a generic inbound and outbound data connectivity interface. The method may be executed on a specially programmed computer system comprising one or more computer processors, electronic storage devices, and networks. According to one embodiment, the invention comprises a best-fit data matching application program interface (API) that provides data and operational access to users through a configurable data endpoint (Application Programmable Interface—API). This embodiment of the invention may comprise a system and method for obtaining data from the best source via a configurable API in situations where the data is available from multiple sources. Embodiments of the invention may include a query processor which examines a user specified request and implicit parameters to direct the queries to the data source which best supports the data requirement. For example, query time boundaries can be automatically extracted and consequently used to direct queries to data archives/warehouses and transactional systems for queries demanding real-time or near-real-time response rates. Similarly, data queries can be redirected to systems with the desired data quality metrics against the required fields (e.g., most complete data sets, most up to date data). Additionally, preferential query direction can be cascaded to support situations where a first preference source is unavailable (due to maintenance or unscheduled outage) and the initial query is redirected to the source of second preference.

Such an API can be provided as part of an enhanced technology platform, such as a platform that provides financial reporting services such as investor reporting, to clients of a financial institution or other business. The API exposes selected applications within the financial services application ecosystem in a controlled manner to enable clients to retrieve and interpret their data without support or direction from operational and support personnel of the financial institution or other business. Exemplary embodiments of the invention can thus enable clients to seamlessly integrate and discover available resources with the most appropriate services for their needs.

According to another embodiment, the invention comprises a system and method for data customization via a two-way API and client-partitioned data store. In this embodiment, the system and method can enable self-managed client specified data to be used to customize raw data, reports, and queries of the business.

Exemplary embodiments of the invention can provide a number of advantages to a business or organization and to its clients. For example, the bidirectional network interface system can provide a documented, consistent, scalable and standardized manner of data acquisition and distribution, as well as a self-discovery process using a single API for all authorized services and data within a business. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 1 is a matrix that describes varying maturity levels for the primary functions of a bidirectional network interface according to an exemplary embodiment of the invention.

DETAILED DESCRIPTION

Figure 2:
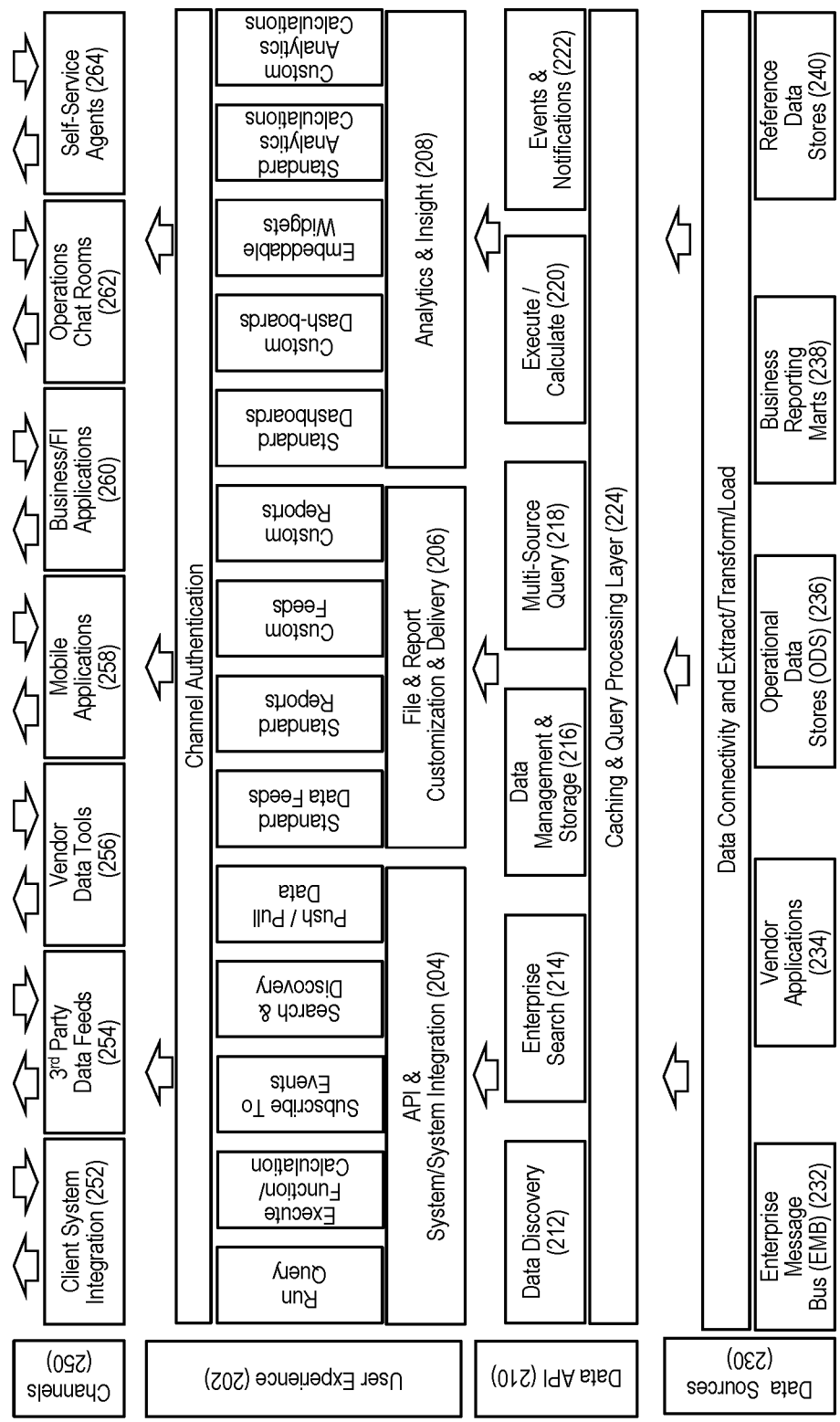
FIG. 2 is a diagram illustrating the high level architecture of the bidirectional network interface system according to an exemplary embodiment of the invention.

Exemplary embodiments of the invention will now be described in order to illustrate various features of the invention. The embodiments described herein are not intended to be limiting as to the scope of the invention, but rather are intended to provide examples of the components, use, and operation of the invention.

FIG. 1 is a matrix that illustrates varying levels of maturity (basic 102, intermediate 104, advanced 106) for the primary functions of the API according to an exemplary embodiment of the invention. As shown in FIG. 1, the six primary functions of the API are: Data Discovery 112, Enterprise Search 114, Multisource Query 116, Execute/Calculate 118, Data Management & Storage 120 and Events/Notifications 122, according to this example.

Data Discovery 112 refers to ability of the client to understand and retrieve the various data sets in the system that the client is permitted to access. At the basic maturity level 102, the Data Discovery function retrieves data sets that a login user or production ID has access to. At the advanced maturity level 106, the Discovery function provides the ability to retrieve the data sets and related data attributes specific to the user's login based on entitlements.

The Enterprise Search function 114 of the API allows a client to retrieve data based on different searching processes. In a basic Search, the client can retrieve data based on a natural language search. This approach may include using string tokenization, enrichment and substitution to search physical and metadata stores and return a weighted and ranked result set. At an intermediate level of maturity, the Enterprise Search function may include an automated agent assisted search. The system enables interaction with an automated service agent that is able to access and use previous search characteristics to suggest search results or areas of direct and indirect interest. The automated service agent may be embodied as a chatbot, for example, which is used to determine the intent of a question or query from the user. Where the user supplies a query with an insufficient degree of specificity, the automated service agent will request specification of query details. For example, a user requesting "show me my account balances" may be asked for further specification on "Please specify a set of accounts or say/type 'all' for balances against all accounts." Previous search results may be used to imply specificity on a query where it is not originally supplied. For example, where a user requests "show me my account balances," repeated further specification of "All" can be implied in the first instance in future queries.

An advanced Search may include rendering a visualization to support the query. The system enables interaction with an automated assistant as per "assisted visualization" whereby graphical result sets are returned and can be saved as a preference for scheduled or routine extracts, reporting and analytics. In this embodiment, natural language generation (text/speech) is bypassed or enriched with a visual answer. For example, a user requesting "Show me my account balances" can be returned with a textual/vocal description of account balances and/or an interactive widget (a bar chart, for example) which shows the total balance (y axis) and account identifier (x axis). The ability to convert a textual or vocal question is made possible by virtue of the principle of the API layer being foundational to all downstream client-facing channels. This method may be extended to incorporate a voice interface, similar to interfaces offered by Google, Microsoft and Amazon.

The Multisource Query function 116 of the API allows the user to retrieve data from data stores behind the API. At a basic maturity level, the query may retrieve data from the API in a preferred format (e.g. xml, json) from an Integrated Data Layer (IDL). This use case may be suitable for data interaction that can tolerate non interactive latency (batch based processing and data delivery, for example). It can support batch or scheduled daily reporting needs and query of historic data. At an intermediate maturity level, the Multisource Query function may be a near real-time query that retrieves data directly from an underlying source. This use case can provide support for lifecycle events and exception management or notification use cases, for example. This channel can also be used in the Execute/Calculate function 118 to remediate data issues which are causing blocking/non-blocking processing issues and to increase self-service capability for users. At an advanced maturity level, the query may be used to combine batch/archived and near real-time data allowing the data consumer to execute functions that require a combination of data types. This method can be used to create transactions and updated views which reflect data included in the last batch and data which has been updated between the last batch and current/configured time.

The Execute/Calculate function 118 of the API allows a user to perform entitled functions. At a basic maturity level, the Execute/Calculate function is equivalent to "Direct Query." At intermediate level it is used to execute an exposed function on a system behind the API, which involves the execution/return of function/data from any source behind the API. An example of this function is the execution of a procedure exposed in an underlying system which changes data or state (e.g., repair a trade record, replace a price file and rerun a portfolio valuation). At an advanced level, the Execute/Calculate function may be a used for calculations which involve creating a pre-defined calculation.

The Data Management and Storage function 120 of the API allows a client to publish and manage custom data. At a basic level of maturity, this function may involve template-based customization specifications in which clients publish data to an API into a template that is used to create client views (e.g., client preferred prices, hierarchies, identifiers, etc.). At an intermediate level, the Data Management and Storage function may involve conditional, per-account/user preferences in which the client manages the scope of over-rides in conjunction with account groups or entitlement. Preferences can be applied on a per channel basis. At an advanced level, the Data Management and Storage function may involve external data integration in which clients can load reference information from third/external parties for later data customization or inclusion in calculations.

The Events & Notifications function 122 of the API allows a client to obtain data on an event driven basis (subscription). At a basic level of maturity, the Events & Notifications function involves scheduled data delivery in which the API is used to deliver data to a designated location over a secure channel, e.g., secure file transfer protocol (sftp). At an intermediate level, the Events & Notifications function may involve scheduled multi-part delivery in which the API is used to deliver extract-sets (multiple extracts) over sftp to a client designated drop site. Preferably, multi-part deliveries can only be generated when dependent data sets are available (e.g., data-dependant workflow). At an advanced level of maturity, the listen function may involve classified topics with an event based pipeline push event in which data can be delivered to a client based on the client subscription to categorized data topics. Data is streamed by push event and can be used to update multiple channels simultaneously including chat-rooms, mobile notifications and web-based alerts.

FIG. 2 illustrates a high level architecture of the generic entry and exit network interface system according to an exemplary embodiment of the invention. As shown in FIG. 2, the architecture illustrates a User Experience layer 202 that depicts a variety of channels through which a user can interact with data, namely API & System/System Integration 204, File & Report Customization & Delivery services 206, and Analytics & Insight services 208. The User Experience layer 202 is composed of these three core capabilities 204, 206, 208 according to an exemplary embodiment of the invention. Within each core capability, sub-capabilities access Data API services 210 to obtain and present a consistent view of data that is made available from any internal source which is short-listed for external access/exposure.

The User Experience layer 202 is underpinned by the Data API layer 210 that includes the following primary functions: Data Discovery 212, Enterprise Search 214, Data Management/Storage 216, Multisource Query 218, Execute/Calculate 220, and Events & Notifications 222. As shown in FIG. 2, the Data Discovery function 212 enables entitlement based data discovery across multiple federated systems in the Data Sources layer 230. Data sources may include messaging systems 232, third party/vendor applications 234, operational data stores 236, reporting marts 238, and reference data stores 240. Where data is federated in this way (not single sourced) it is the responsibility of the data discovery function 212 to interact with the data sources to ensure that only the correct set of rows/columns are returned from the query (i.e., the data to which a user is entitled).

The Enterprise Search function 214 enables multiple systems to be searched by value/text/language. Enterprise search uses tokenization and substitution of entered data queries to search for key values within the underlying federated sources and returns the ranked set of results matching the entered query. The Data Management & Storage function 216 allows clients to send data for storage (directly or from third parties). The Multisource Query function 218 enables data to be retrieved from one of more of the Data Sources systems 230 shown in FIG. 2, any underlying system, or any event queue which is topically partitioned. The Multi-Source Query service 218 enables data to be merged across sources from the Data Sources layer 230. The Execute/Calculate function 220 executes operations from live back end systems (e.g., in the Data Sources layer 230) or interpreted data relationships including passing data to back end systems. The Events & Notifications function 222 enables clients or event listeners to register for channel alerts (e.g., exceptions or new data notifications). It provides a publish/subscribe channel to the User Experience layer 202, enabling near real-time notifications and updates downstream.

The Caching & Query Processing Layer 224 extracts an entitled data set and applies specified parameters (e.g., data range and quality parameters) before invoking a best matching data service. Here, a data cache can be globally replicated to enable locality of reference.

In the Reference Data Stores 240 of the Data Sources layer 230 there is a meta data store of logical data model (LDM) data, e.g., representation of an organization's data, organized in terms of entities and relationships. The metadata store also includes data quality metrics for source/data sets. The data quality (DQ) metrics are one example of the data in the data store that is used to select the most appropriate data source based on a user's query. The Reference Data Stores 240 of the Data Sources layer 230 also includes a client data partition for client supplied datasets hierarchies and alternative identifiers, and a data index of LDM data of frequently used attributes and services. The Reference Data Stores 240 may also include enterprise metadata, entitlement, account, party, instrument and pricing data.

The system provides federated entitlements as an entitlements source of client data and entitlement configurations from registered sources. Proxied queries can be executed, e.g., queries directed to a source outside of the LDM compliant physical data for low latency queries. The events channel comprises a categorized event publishing stream.

The Data Sources layer 230 also includes an enterprise message bus (EMB) 232 for real-time notifications and events, vendor applications 234 and operational data stores (ODS) 236 for application integration, and business reporting marts 238 for direct client-ready data.

FIG. 2 also illustrates a number of data access channels 250 that support client system integration 252, integration of external (third party) data feeds 254, integration of vendor data tools 256 (e.g., Excel), mobile applications 258, business/financial institution (FI) resident applications 260, operational chat rooms 262, and self service agents 264 (e.g., Symphony).

As described above, according to one embodiment, the invention comprises a best-fit data matching application program interface (API) that provides access through a user-configured data subscription. This embodiment of the invention may comprise a system and method of obtaining data from the best source via a configurable API in situations where the data is available from multiple sources. Embodiments of the invention may include a query processor which examines query syntax and/or implicit parameters to direct the queries to the highest ranking data source. Syntax examination can be used in the system and method to determine the time-window of data to be retrieved and consequently direct queries to archives (for long windows) and operational systems (for short windows). Similarly, data queries can be redirected to systems with the highest data quality (e.g., most complete data, most consistent data, most accurate data).

Such a client facing API can be provided as part of an improved technology platform, such as a platform that provides financial services such as custody services, funds services, data analytics, and other information services or transaction services to clients of a financial institution or other business. The API can place an executable façade in front of selected applications within the financial services application ecosystem to enable clients to self-serve their data without intermediation from operational and support personnel of the financial institution or other business. Exemplary embodiments of the invention can thus enable clients to seamlessly integrate and discover with the most appropriate services for their needs.

Figure 3:
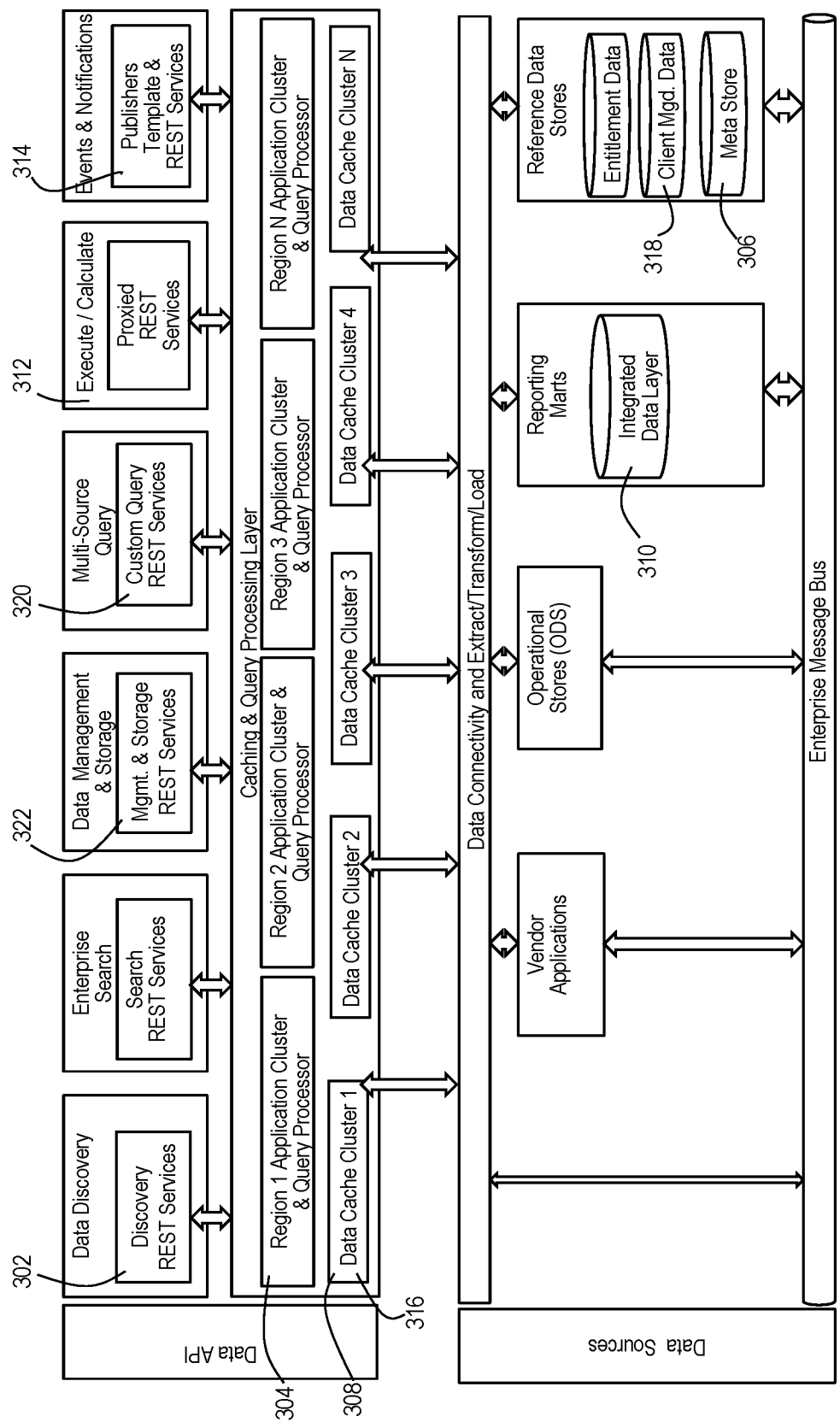
FIG. 3 is a diagram showing an overview of a best-fit data matching API through a user-configured subscription according to an exemplary embodiment of the invention.

FIG. 3 illustrates such an embodiment. As shown in FIG. 3, the API at 302 exposes data services via a testable service registry. A testable service registry allows data services which have been made available to users to be invoked by users with a set of allowable parameters. In this way, a user of the Data API shown in FIG. 3 may tune their query to include a given set of rows and columns from the service itself. This style of invoke-examine API invocation allows a user to adjust their queries to be optimal for their use case e.g., minimize the number of rows and columns in the returned data set. At 304, a query is invoked with parameters (e.g., service name and input parameters), and entitlements are used to check the user's universe of available services. The query processing service comprises a pre-processing cache that examines parameters and matches against a best match metadata store 306 (e.g., if highest quality is determined, then the function with highest data quality (DQ) result in metadata is matched). At 308, the query enables data to be retrieved from the Integrated Data Layer 310, any live back end system, or any event queue which is topically partitioned.

Through the execute function 312, operations can be executed from live back end systems via proxied query. Ad-hoc data joins can be executed in the multi-region data cache. With the events and notifications service 314, event listeners can register for channel alerts (e.g., exceptions, new data notifications). The query processor 316 extracts an entitled service set and applies specified parameters (e.g., data range, quality parameters) before invoking the best matching data service and returning as a recordset to the Discovery REST Services at 302. In FIG. 3, REST Services refers to web services that use the Representational State Transfer format that defines a set of constraints and properties based on HTTP.

Figure 4:
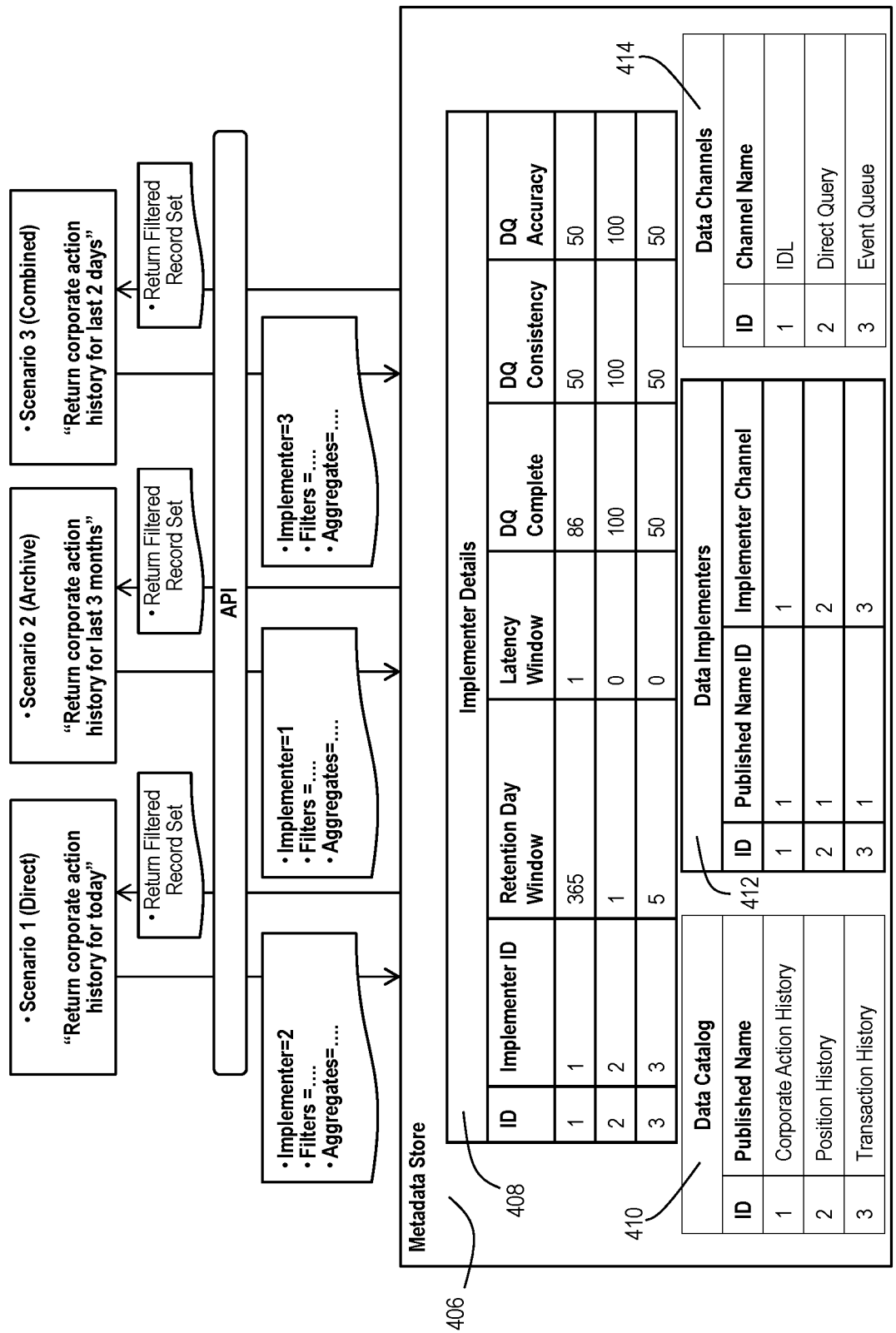
FIG. 4 is diagram showing an example of various scenarios and a metadata store for the best-fit data matching API according to an exemplary embodiment of the invention.

FIG. 4 is diagram showing an example of various scenarios and a meta store for the best-fit data matching API through a user configured subscription according to an exemplary embodiment of the invention. In the FIG. 4 example, there are three scenarios illustrated. The first scenario ("Direct") relates to a request for short term, current data, e.g., a request to return the corporate action history for today. The second scenario ("Archive") relates to a request for data covering a longer period of time, e.g., corporate action history for the last three months. The third scenario ("Combined") relates to a request for data covering an intermediate time period, e.g., corporate action history for the last two days with actions that a client may have executed. Based on the different time periods involved, these queries are directed to different databases in order to enhance accuracy and efficiency. The query processor is programmed to direct queries to the appropriate database depending on a number of factors including the type of data requested, the time frame, and client permissions.

The query processor in FIG. 4 utilizes a metadata store 406 (shown in FIG. 3 as element 306 in the Reference Data Stores) to customize and refine the query according to the client's permissions and the characteristics of the requested data. As shown in FIG. 4, the metadata store 406 includes a table 408 for implementer details. The implementer details may include an ID, an implementer ID, a retention day window (a qualifier which specifies the amount of history a data provider exposes), a latency window (a measurement of how performant the data implementing system is at returning data), and parameters representing the Data Quality (DQ) completeness, DQ consistency, and DQ accuracy for each implementer. The metadata store 406 also stores tables containing data relating to data catalogs 410, data implementers 412, and data channels 414. The data catalog table 410 provides a reference number for different types of historical data, such as corporate action history, position history, and transaction history. The data implementers table 412 provides a mapping between a published name ID and an implementer channel. The data channels table 414 provides a mapping between an ID and a channel name, such as IDL (integrated data layer), direct query, and event queue. The tables in the metadata store 406 are used by the API to determine the best fit data matching for a particular client based on the client's permissions, the type of data requested, and the relevant time period of the data. The system can thus automatically direct the user's query to the appropriate data source and/or services using the information stored in the metadata store.

The three scenarios depicted in FIG. 4 demonstrate the advantageous feature of using this metadata approach to determine the best data source to which a query should be directed based on query parameters. In FIG. 4, Scenario 1, corporate action data for today is requested by the user. Corporate Action History is an available service in the Data Catalog 410 shown in FIG. 4. From the Data Implementers table 412 it is known that corporate action data is available from three channels namely the IDL (integrated data layer), via Direct Query, and via an Event Queue. Furthermore, it is known that each available channel exposes different windows and data quality standards as seen in the Implementer Details table 408 in FIG. 4. In this example, while data is available from three sources the best matching data source to the required data is determined to be channel 2 since it has today's data (retention value=1), has a low latency (latency windows=0) and has a measured data quality of 100%. While the other channels (1 and 3) expose the required data, they do so at a greater latency and/or a lower data quality (for channel 1 the latency window=1 and the data quality is 50-86%, while for channel 3 the data latency is similar to channel 2 but the data quality score is 50%).

According to another embodiment of the invention, a system and method are provided for self-managed client specified data to be used to customize standard data, queries, and reports of the business. FIG. 3 illustrates an example of the data customization via a two-way API and the client partitioned data store according to an exemplary embodiment of the invention. As shown in FIG. 3, the API 302 exposes data services which are the standard offerings that the business or financial institution displays. The API enables clients to send custom data in to a controlled partition, Client Managed Data Store 318. Client pushed data is mapped to standard services via the metadata store 306. Standard/Custom Services can be called by the API in "Standard," "Custom," or "Hybrid" mode. Standard data preserves the financial institution's standard view. Custom mode replaces the financial institution's standard view with the client view (replacing standard IDs with custom IDs/hierarchies). Hybrid augments standard view with a client view so both client and custom form are present in the same record. In this way, the client has the ability to relate its custom data to the standard output data of the financial institution and to cause the output data to be customized according to the client's preferences.

The ability to enrich standard data with client supplied data through data services mapping provides an advantageous feature of the systems and methods described herein. For example, data obtained from Custom Query Rest Services 320 in FIG. 3 may return a standard set of market reference data for market traded instruments obtained from the Integrated Data Layer 310. Clients may supply a set of mappings to supplement standard data with enrichments, e.g., preferred identifiers or classifications on market traded instruments. These mappings are pushed through the Management and Storage REST Services 322 and stored in the Client Managed Data store 318 shown in FIG. 3. Where such enrichments exist, data subsequently requested through the Custom Query REST Services 320 can augment the previously standard market data with client specific values.

Figure 5:
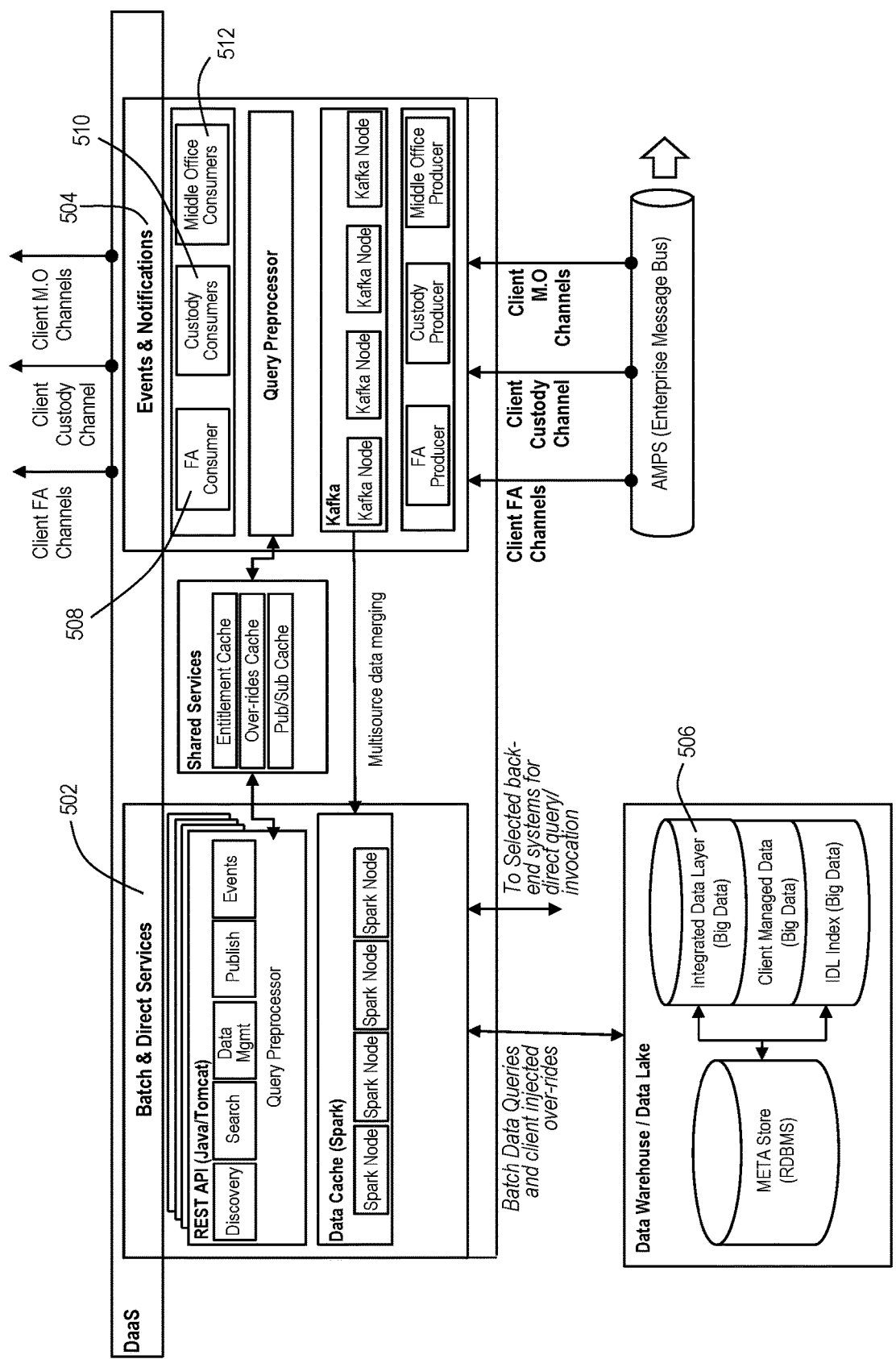
FIG. 5 is diagram of a technology stack used in connection with the API according to an exemplary embodiment of the invention.

FIG. 5 shows a technology stack that can be used in connection with the API according to exemplary embodiments of the invention. As shown in FIG. 5, the technology stack includes a Data as a Service (DaaS) component for batch and direct services 502, and a DaaS component for event service topics 504. The batch and direct services 502 include the above-described functions of the interface, including Data Discovery, Enterprise Search, Multisource Query, Data Storage and Management, Execute/Calculate and Notifications & Events. The batch services involve sending batch data queries and client injected overrides to the integrated data layer 506. The direct services involve sending queries or commands to selected back end systems for direct query/invocation. The DaaS event service topics provide various published data streams to different categories of end users, such as Fund Accounting (FA) fund accountant and fund operational staff 508, custody operations and back office consumers 510, and middle operational staff and investment managers 512. The data streams can be provided by client multiple classifications including but not limited to FA channels, client custody channels, or client middle office channels.

The embodiments described above can provide advantages to a financial institution or other business and to its clients. For example, the platform can be designed to ingest/deliver a well-documented data definition, and it can utilize the entitlement process to achieve bi-directionality of data flows. It can also be used to implement a process of aggregating data that is broad in scope, i.e., different volume, variety and frequency of update. While the API is preferably designed as a single API that interfaces with all of the various data sources and services in a particular business, it may be manifested as a family of consistent, similarly entitled APIs and it is able to provide significant value by enabling self-discovery of data sources and services by the client, using the metadata store to customize queries and direct them to the appropriate data sources, and customize output datasets according to the user's preferences, including the incorporation of client data into the output. The bidirectional network interface system can also be expanded to integrate with third party vendors, cloud providers, and/or blockchain/distributed ledger services according to other embodiments of the invention. Additionally, various embodiments of the invention can provide platform simplification through self-documented, consistent, scalable and standardised manner of data ingestion and distribution. These embodiments can provide a market leading client platform strategy that includes functionality to exchange data in multiple formats.

The system described above can be implemented with servers and other computing devices in various configurations. For example, the generic entry and exit network interface can be implemented with an API server that interfaces with the clients and also with the various servers and systems of the financial institution that provide data and services. A client may communicate with the API server via a network such as the internet with a personal computing device such as desktop computer, laptop computer, tablet computer, smart phone, and or other mobile computing device. The various servers and computing devices may use software to execute programs to execute the methods described above. Various embodiments of the invention also relate to the software or computer readable medium containing program instructions for executing the above described methods for providing a bidirectional network interface.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers and personal computers described above and in the drawings may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications networks connecting the various computing devices described above may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for providing data services for a user via a bidirectional network interface, wherein the user is a client of a financial institution, the financial institution provides data services to the client via an application programming interface (API), and the API enables the client to transmit client-specific data to the financial institution, the method comprising:
    exposing to the user, via the API, data services which have been made available electronically to the user, wherein the data services are invoked with a query comprising a set of parameters;
    enabling the user, with the API, to electronically transmit client-specific data to a client managed data store maintained as part of a reference data store in a data sources layer;
    storing the client-specific data in the client managed data store;
    electronically mapping, using information stored in a metadata store maintained by the financial institution, the client-specific data to one or more of the data services provided by the financial institution;
    enabling the user to specify, via the API, a presentation mode for a data set returned by the query, wherein the presentation mode comprises: (a) a standard mode in which the data set provided by the financial institution is presented electronically to the user in a standard view of the financial institution, (b) a custom mode in which one or more client-specific data elements replace one or more business-specific data elements in the returned data set; and (c) a hybrid mode in which both client-specific data elements and business-specific data elements are presented in the returned data set; and
    electronically presenting the returned data set to the user in the presentation mode selected by the user.

2. The method of claim 1, wherein the client-specific data elements comprise client reference numbers, and the business-specific data elements comprise business reference numbers.

3. The method of claim 1, wherein the client-specific data elements comprise one or more client classifications of market-traded instruments.

4. The method of claim 1, wherein the API is designed to use an automated query processing service, executed with a computer processor, to automatically analyse the parameters and match the parameters to a best electronic data source among a plurality of electronic data sources using the metadata store stored in the computer memory, wherein the step of matching the parameters to the best electronic data source is based on a data quality metric, a date range, and user permissions stored in the metadata store.

5. The method of claim 4, wherein the data quality metric comprises at least one of a data quality completeness metric, a data quality consistency metric, and a data quality accuracy metric.

6. The method of claim 4, wherein the date range is defined by at least one of a retention day window that defines an amount of history a data source exposes and a latency window that defines the latency of a data source in returning data.

7. The computer-implemented method of claim 1, further comprising using the metadata store to return a weighted and ranked result set of data sources.

8. The computer-implemented method of claim 1, wherein the API is designed to enable the user to customize a data request to specify rows and columns to be returned from a data source.

9. The computer-implemented method of claim 4, wherein the query processing service is programmed with a multisource query function that support a query for historic data from one or more archived sources, near real-time query directly from one or more data source and query for combination of archived and near real-time data.

10. The computer-implemented method of claim 4, wherein the plurality of electronic data sources comprises one of an integrated data layer, one or more third party data sources via a proxied query, and one or more events channel.

11. A computer-implemented system for providing data services for a user via a bidirectional network interface, wherein the user is a client of a financial institution, the financial institution provides data services to the client via an application programming interface (API), and the API enables the client to transmit client-specific data to the financial institution, the system comprising:
    a memory; and
    a computer processor that is programmed to:
    expose to the user, via the API, data services which have been made available electronically to the user, wherein the data services are invoked with a query comprising a set of parameters;
    enable the user, with the API, to electronically transmit client-specific data to a client managed data store maintained as part of a reference data store in a data sources layer;
    store the client-specific data in the client managed data store;
    electronically map, using information stored in a metadata store maintained by the financial institution, the client-specific data to one or more of the data services provided by the financial institution;
    enable the user to specify, via the API, a presentation mode for a data set returned by the query, wherein the presentation mode comprises: (a) a standard mode in which the data set provided by the financial institution is presented electronically to the user in a standard view of the financial institution, (b) a custom mode in which one or more client-specific data elements replace one or more business-specific data elements in the returned data set; and (c) a hybrid mode in which both client-specific data elements and business-specific data elements are presented in the returned data set; and
    electronically present the returned data set to the user in the presentation mode selected by the user.

12. The computer-implemented system of claim 11, wherein the client-specific data elements comprise client reference numbers, and the business-specific data elements comprise business reference numbers.

13. The computer-implemented system of claim 11, wherein the client-specific data elements comprise one or more client classifications of market-traded instruments.

14. The computer-implemented system of claim 11, wherein the computer processor is further programmed to use the metadata store to return a weighted and ranked result set of data sources.

15. The computer-implemented system of claim 11, wherein the API is designed to enable the user to customize a data request to specify rows and columns to be returned from one or more data source.

16. The computer-implemented system of claim 11, wherein the API is designed to use an automated query processing service, executed with a computer processor, to automatically analyse the parameters and match the parameters to a best electronic data source among a plurality of electronic data sources using the metadata store stored in the computer memory, wherein the step of matching the parameters to the best electronic data source is based on a data quality metric, a date range, and user permissions stored in the metadata store.

17. The computer-implemented system of claim 16, wherein the data quality metric comprises at least one of a data quality completeness metric, a data quality consistency metric, and a data quality accuracy metric.

18. The computer-implemented system of claim 16, wherein the date range is defined by at least one of a retention day window that defines an amount of history a data source exposes and a latency window that defines the latency of a data source in returning data.

19. The computer-implemented system of claim 16, wherein the plurality of electronic data sources comprise one of an integrated data layer, one or more third party data sources via a proxied query, and one or more events channel.

20. The computer-implemented system of claim 16, wherein the automated query processing service an automated query processing service is programmed with a multisource query function that support a query for historic data from one or more archived sources, near real-time query directly from one or more data source and query for combination of archived and near real-time data.

\* \* \* \* \*